(12) United States Patent
Knobel

(10) Patent No.: US 11,617,376 B2
(45) Date of Patent: Apr. 4, 2023

(54) PLANT FOR PRODUCING A FOODSTUFF

(71) Applicant: KW Patente AG, Müstair (CH)

(72) Inventor: Guido Knobel, Kreuzlingen (CH)

(*) Notice: Subject to any disclaimer, the term of this patent is extended or adjusted under 35 U.S.C. 154(b) by 96 days.

(21) Appl. No.: 16/971,060

(22) PCT Filed: Feb. 20, 2019

(86) PCT No.: PCT/EP2019/054241
§ 371 (c)(1),
(2) Date: Aug. 19, 2020

(87) PCT Pub. No.: WO2019/162341
PCT Pub. Date: Aug. 29, 2019

(65) Prior Publication Data
US 2021/0084927 A1   Mar. 25, 2021

(30) Foreign Application Priority Data
Feb. 20, 2018   (DE) .................. 10 2018 103 736.8

(51) Int. Cl.
*A23G 1/20* (2006.01)
*A23G 1/26* (2006.01)
*A23G 7/02* (2006.01)
*B25J 11/00* (2006.01)

(52) U.S. Cl.
CPC .............. *A23G 1/205* (2013.01); *A23G 1/26* (2013.01); *A23G 7/02* (2013.01); *B25J 11/0045* (2013.01)

(58) Field of Classification Search
CPC . A23G 1/205; A23G 1/26; A23G 7/02; A23G 7/0093; A23L 3/361
See application file for complete search history.

(56) References Cited

U.S. PATENT DOCUMENTS

| | | | |
|---|---|---|---|
| 6,318,111 B1 * | 11/2001 | Murakami | A23G 7/02 |
| | | | 62/380 |
| 6,327,969 B1 | 12/2001 | Knobel | |
| 2017/0049122 A1 * | 2/2017 | Laurijssen | A23G 1/22 |
| 2018/0213813 A1 * | 8/2018 | Lenssen | A23G 7/0037 |

FOREIGN PATENT DOCUMENTS

| | | | |
|---|---|---|---|
| EP | 1011345 B1 | 2/2005 | |
| EP | 1757192 A1 * | 2/2007 | A23G 1/18 |
| EP | 2051919 B1 | 3/2010 | |
| EP | 3038472 A1 | 7/2016 | |
| EP | 3111768 A1 | 1/2017 | |
| GB | 2070501 A | 9/1981 | |
| WO | 2015063629 A1 | 5/2015 | |

OTHER PUBLICATIONS

International search report for patent application No. PCT/EP2019/054241 dated Apr. 17, 2019.

* cited by examiner

*Primary Examiner* — Kelly M Gambetta
*Assistant Examiner* — Virak Nguon
(74) *Attorney, Agent, or Firm* — Da Vinci Partners LLC; John Moetteli

(57) ABSTRACT

In an plant for producing foodstuff, in particular a chocolate article, in at least one mould (1) which can be tempered in at least one processing station (3, 8, 9) before and/or after the foodstuff is filled in, wherein the mould (1) being taken over in or at the processing station (3, 8, 9) by a robot (4) and being deposited for tempering, individual, separate trays (5) for the moulds (1) are provided in the processing station (3, 8, 9).

6 Claims, 3 Drawing Sheets

PLANT FOR PRODUCING A FOODSTUFF

BACKGROUND OF THE INVENTION

The invention relates to an plant for producing foodstuff, in particular a chocolate article, in at least one mould which can be tempered in at least one processing station before and/or after the foodstuff is filled in, wherein the mould is taken over in or at the processing station by a robot and is deposited for tempering.

Plants of the above mentioned type are known and available on the market in various forms and designs. They are used to produce a wide range of foodstuffs. In the present case, the main product concerned is a chocolate food.

Chocolate is usually produced in moulds with a large number of mould cavities or recesses into which liquid chocolate is poured. This is often done with a moulding machine in which, for example, pralines are made from two different chocolates or different basic substances. The moulding machine is only mentioned as an example. There are many other plants in the prior art for configuring foodstuffs, especially chocolate masses.

In many cases, it is advisable to preheat a mould into which liquid chocolate is to be filled. This will ensure that an outer skin of the foodstuffs does not immediately solidify in a cold mould while the inside is still liquid. The solidification should take place as evenly as possible. For this reason, for example, a preheating cell is installed upstream of a moulding machine and other filling machines for foodstuffs.

For the most possible controlled solidification of the foodstuff, in particular chocolate, a cooling cell is usually arranged downstream of the moulding machine or similar moulding equipment. In this cooling cell, the moulds are cooled as evenly as possible so that the previously liquid food can solidify and harden as much as possible so that it is not deformed during subsequent handling. In EP 3 038 472 A1 or WO 2015/063629 the moulds are placed on a tray for this purpose.

The transport between the individual processing stations is usually done by means of conveyor belts. But also the transport through the preheating cells and/or the cooling cells is done by means of corresponding conveyor belts. For example, in EP 1 011 345 B1 (U.S. Pat. No. 6,327,969 A) such a device is described as a spiral conveyor. This spiral conveyor surrounds a cylinder, whereby the corresponding moulds are guided past air openings from which air from inside the cylinder flows out. The cylinder is covered at the top. The air flows into the cylinder or its interior from below, which then exits from the air openings and heats or cools the moulds.

Such spiral conveyors have proven themselves in practice, but are relatively expensive, complex in design and not very flexible.

For this reason, handling devices is also used in many cases. For example, EP 2 051 919 B1 or EP 3 111 768 A1 show a corresponding robot for handling objects, especially moulds, in the production of chocolate articles. There it is also pointed out that commercially available robots are used to move confectionery articles, which are usually produced in multiple moulds, into a processing station for curing. However, these commercially available robots, which work with hydraulics or pneumatics, do not meet hygienic concerns. Furthermore, the speed and accuracy of such hydraulic robots is very poor. For this reason, EP 2 051 919 B1 describes an exclusively mechanically moving robot.

In the GB 2 070 501 A, only one mould is shown, in which round moulds are arranged in a carrier and a supply line and a discharge line are connected to the carrier, which allows the circulation of a coolant, e.g. Freon gas. This means that the mould is cooled laterally and from below in the carrier, but not from above.

The US 2017/049122 A1 describes a device as claimed in the preamble of the present invention. Moulds are shown which are transported on a conveyor belt through a cooling chamber. The mould rests on support feet or support strips so that there is a free space between the mould and the conveyor belt. If two conveyor belts are arranged one above the other, a lift system is provided with which the mould can be lifted from one conveyor belt to the other conveyor belt.

Little attention has been paid to the preheating or cooling station itself in the prior art. However, it is precisely their uniformity of action, which encompasses the mould, which is of great importance for the production of the foodstuff and in particular the chocolate articles.

SUMMARY OF THE INVENTION

The present invention is directed to the treatment of the foodstuff in the preheating cell or cooling station, in particular by tempering the mould as extensively as possible and as uniformly as possible so that the conditions for heating or cooling are as uniform as possible at each point of the mould. Particular attention must be paid to the border areas in relation to the centre of the mould, so that the border areas are not heated or cooled faster than the centre. The tempering of the mould should be largely uniformed.

The solution to the object is that in the processing station individual, separate trays for the moulds are provided on a wall, that there are slots in the wall below and/or above the trays for dispensing a tempering medium and that a tempering medium is guided in the trays.

In contrast to the known spiral conveyors, according to the invention the mould to be tempered does not lie full faced of the mould base on a flat conveying element, but is instead on trays which touch the moulds as little as possible or cover mould areas as little as possible. For this reason, the trays are only in point or linear contact with the mould; in the other areas, the mould is exposed to the temperature control medium unhindered. This ensures that the tempering medium can act on the mould almost equally from all sides, so that the entire tempering process is uniform over the entire mould.

In a preferred embodiment, the trays should be U-shaped and protrude from the wall. For example, appropriately curved pipes are suitable, since they also allow a temperature control medium to be guided in them. This ensures that the contact points or lines of contact between the tray and the mould are adapted to the surrounding tempering medium, so that even tempering of the mould is achieved at these contact points.

The trays are preferably designed or adapted to the shape so that the mould either lies on a tray or hangs between two adjacent trays.

Another idea of the present invention relates to the fact that in the above-mentioned wall from which the trays protrude; there are openings of any geometric shape, in particular slots. These serve to guide a tempering medium to the trays. It is also conceivable that a tempering medium is sucked out of the slots. The only important thing is that a certain flow of a tempering medium takes place. This can take place under positive or negative pressure.

The corresponding processing station, is it a preheating cell or a cooling cell, is of course assigned to corresponding aggregates that temper the medium that is led to the trays.

BRIEF DESCRIPTION OF THE DRAWINGS

Further advantages, features and details of the invention result from the following description of preferred embodiment and from the drawing; these show in FIG. 1 an overall perspective view of a plant for the production of foodstuffs according to the invention.

DETAILED DESCRIPTION

Figure 1:
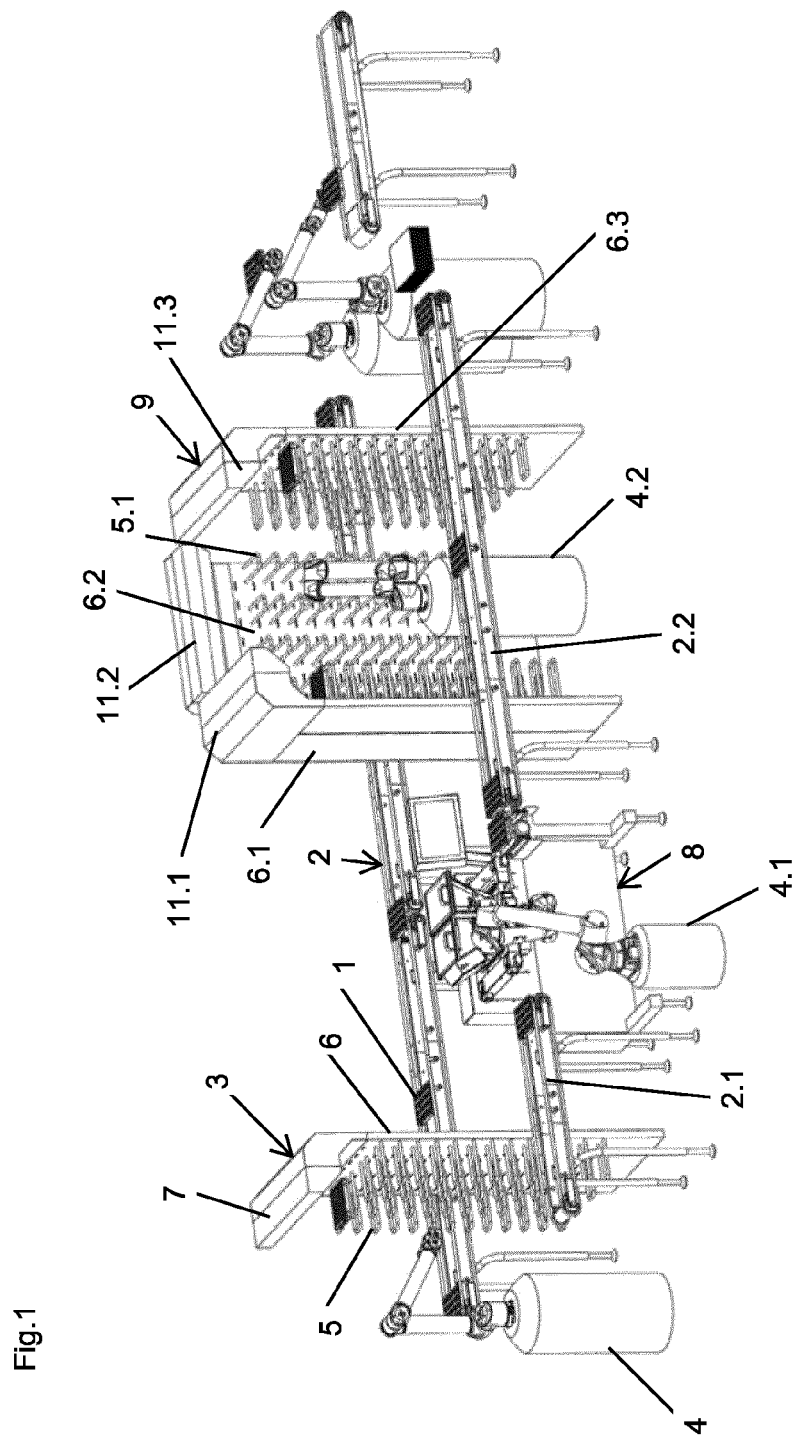
As shown in FIG. 1, a plant for the production of a foodstuff has various processing stations between which moulds 1 for the production of a foodstuff are transported. The transport takes place on a series of conveyor belts 2.

First, the mould 1 is transferred to a preheating cell 3, in which the moulds 1 are preheated. For this purpose, the mould 1 is removed from the conveyor belt 2 by a robot 4 and deposited on trays 5 in the preheating cell 3. For simplicity, the preheating cell 3 has a wall 6 from which the trays 5 protrude. In the exemplary embodiment shown, the trays 5 are designed as U-shaped tubes, as described in more detail below. Above the trays 5 there is an aggregate 7 for supplying heat to the moulds 1 and the trays 5 respectively.

The robot 4 takes the heated mould 1 from the trays 5 again and places it on a subsequent conveyor belt 2.1. This conveyor belt 2.1 transports the moulds to a moulding machine 8. There another robot 4.1 takes the mould from the conveyor belt 2.1 and places it in moulding machine 8. In moulding machine 8, the mould 1 or corresponding recesses/cavities in the mould 1 are filled with liquid food, for example chocolate.

After filling the mould 1, the robot 4.1 takes the filled mould 1 out of the moulding machine 8 and places it on another conveyor belt 2.2. This conveyor belt 2.2 leads to a cooling cell 9 where the filled moulds 1 are cooled. For this purpose another robot 4.2 takes the moulds 1 from the conveyor belt 2.2 and places them on trays 5.1 in the cooling cell 9, as described later.

After the moulds 1 have cooled appropriately, the robot 4.2 takes the moulds from the trays 5.1 and places them back on the conveyor belt 2.2, through which the moulds are transported for further processing.

Figure 2:
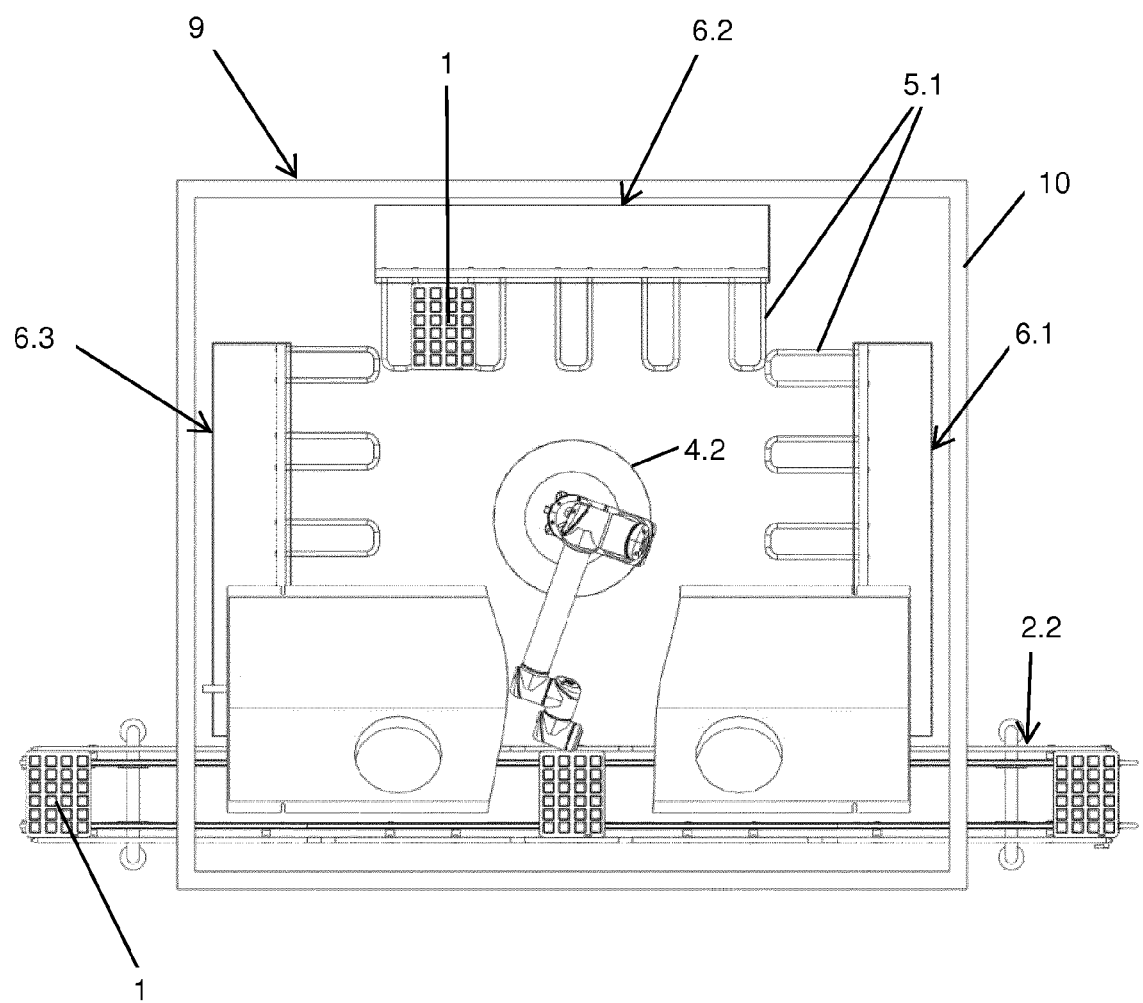
FIG. 2 a schematic top view of a processing station of the plant according to FIG. 1.
Figure 3:
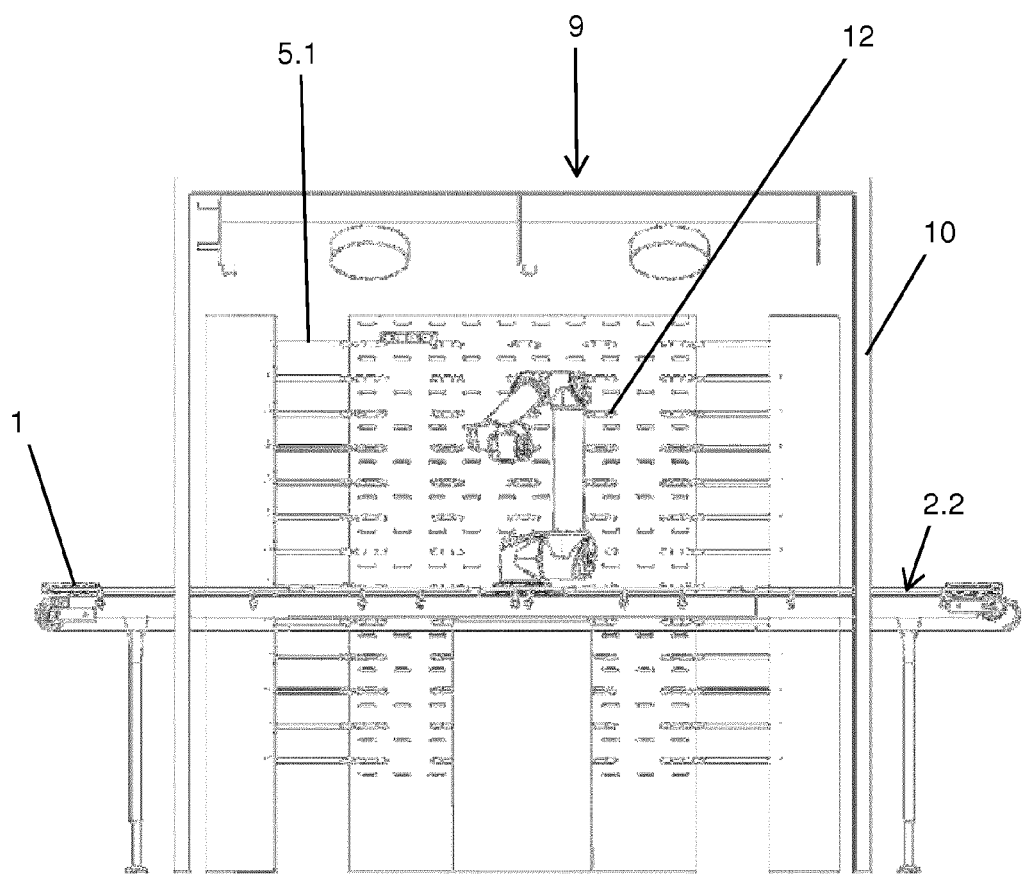
FIG. 3 a schematic front view of a processing station in the plant as shown in FIG. 1.

As shown in FIGS. 2 and 3, the cooling cell 9 is enclosed by a housing 10. The housing 10 is traversed by the conveyor belt 2.2, on which the mould 1 is located.

The robot 4.2 is surrounded by three identically designed walls 6.1, 6.2 and 6.3. From each wall 6.1, 6.2 and 6.3 protrudes a number of trays 5, which are designed as curved tubes. A tempering medium, for example, can be guided in these curved tubes 5. In the case of the tray 5 in the preheating cell 3 it is a heating medium, in the case of the tray 5.1 in the cooling cell 9 it is a cooling medium.

The walls 6.1, 6.2 and 6.3 are each fitted with a cooling unit 11.1, 11.2 and 11.3, from which, for example, cooling air is discharged which falls on the moulds 1 on the trays 5.1.

According to the invention, however, slots 12 are also formed in the walls 6.1, 6.2 and 6.3, in particular between the trays 5.1, through which a cooling medium, especially cooling air, is applied to or under the moulds 1 on the trays 5.1.

The functioning of the present invention is as follows:

Empty moulds 1 are directed on the conveyor belt 2 to the preheating cell 3. The robot 4 takes the empty mould 1 from the conveyor belt 2 and places it on trays 5 in the preheating cell 3, which protrude from the wall 6. The moulds 1 are placed on the trays 5 in such a way that they are only supported at points or in lines, so that as large an area of the mould as possible is exposed to a heating medium without being shielded by a flat tray. In particular, the mould 1 is placed between two tubularly curved trays so that the mould 1 rests on a straight tubular part of each of the two adjacent trays 5. However, the trays 5 themselves can also be designed according to the geometry of the mould 1, so that a mould also rests linearly on a tray.

As soon as the moulds are properly preheated, they are removed again by the robot 4 and placed on the conveyor belt 2.1, which takes the mould 1 to the moulding machine. There the corresponding foodstuff is placed in the recesses in the mould 1, so that the mould is now filled.

This filled mould is removed by the robot 4.1 from the moulding machine 8 and placed on the conveyor belt 2.2. The conveyor belt 2.2 takes the filled mould to the cooling cell 9, where the robot 4.2 takes the mould from the conveyor belt 2.2 and places it on the trays 5.1. In particular FIG. 2 shows that two adjacent trays 5.1 also pick up the mould 1 with a straight piece of pipe, so that in the cold cell 9 almost the entire mould is exposed to the cooling medium without being covered. The slots 12 ensure that the mould 1 is exposed to the cooling medium not only from above but also from below. As a result, a very uniform and rapid cooling of the moulds 1 or the foodstuff in the moulds 1 respectively takes place.

After sufficient cooling, the mould is removed again by the robot 4.2 from the cooling cell 9 and placed on the conveyor belt 2.2 for further processing.

| Reference list | |
|---|---|
| 1 | mould |
| 2 | conveyor belt |
| 3 | preheating cell |
| 4 | robot |
| 5 | trays |
| 6 | wall |
| 7 | aggregate |
| 8 | moulding machine |
| 9 | cooling cell |
| 10 | housing |
| 11 | cooling unit |
| 12 | slot |

The invention claimed is:

1. Plant for producing foodstuff, in
at least one mould (1) which can be tempered in at least one processing station (3, 8, 9) before and/or after the foodstuff is filled in, wherein the mould (1) being taken over in or at the processing station (3, 8, 9) by a robot (4) and being deposited for tempering thereby, wherein, in the processing station (3, 8, 9), individual, separate trays (5) for the moulds (1) are provided on a wall (6-6.3), wherein slots (12) for dispensing a tempering medium are located below and above the trays (5) in the wall (6-6.3), and wherein a tempering medium is guided in the trays (5).

2. Plant according to claim 1, wherein the trays (5) only come into punctual or linear contact with the moulds (1).

3. Plant according to claim 2, wherein the foodstuff is a chocolate article.

4. Plant according to claim 1, wherein the trays (5) are U-shaped.

5. Plant according to claim 1, wherein the trays (5) are tubular.

6. Plant according to claim 1, wherein the foodstuff is a chocolate article.

\* \* \* \* \*